United States Patent [19]

Liang et al.

[11] Patent Number: 5,740,356

[45] Date of Patent: Apr. 14, 1998

[54] READ-ERROR MANAGEMENT DURING RETRIEVING DATA STORAGE-MEDIUM EMPLOYING A DATA-RETRIEVING OPTICAL BEAM

[75] Inventors: Shwu-Jian Liang; Wei-chang Chen, both of Taipei, Taiwan

[73] Assignee: Delta Electronics, Inc., Taipei, Taiwan

[21] Appl. No.: 595,343

[22] Filed: Feb. 1, 1996

[51] Int. Cl.[6] .................................................. G06F 11/00
[52] U.S. Cl. ...................... 395/183.22; 369/53; 369/119
[58] Field of Search ...................... 395/183.22, 183.18, 395/185.07; 369/47, 53, 119

[56] References Cited

U.S. PATENT DOCUMENTS

| | | | |
|---|---|---|---|
| 4,505,585 | 3/1985 | Yoshikawa et al. | 356/237 |
| 4,789,974 | 12/1988 | Satoh et al. | 369/44.32 |
| 5,063,545 | 11/1991 | Nishida | 369/32 |
| 5,065,388 | 11/1991 | Roth et al. | 369/47 |
| 5,067,128 | 11/1991 | Nakane | 371/5.5 |
| 5,124,966 | 6/1992 | Roth et al. | 369/47 |
| 5,239,530 | 8/1993 | Seo et al. | 369/54 |
| 5,485,449 | 1/1996 | Nakajo | 369/116 |
| 5,521,895 | 5/1996 | Miura et al. | 369/50 |

*Primary Examiner*—Robert W. Beausoliel, Jr.
*Assistant Examiner*—Dieu-Minh Le
*Attorney, Agent, or Firm*—Bo-In Lin

[57] ABSTRACT

A compact disk read-only-memory (CD-ROM) data handling system for reading data from a CD by employing a CD drive which is controlled by a computer through an CD-interface to operate at several reading speeds. The CD-ROM data handling system includes a read-error management program executed by the computer for managing a read error. The read-error management program issuing a speed control command through the CD-interface for reducing the CD drive to a lower speed for reading the CD-ROM again at a lower speed whereby the read error is more likely to be prevented. In a preferred embodiment, the read-error management program is provided to automatically issue the speed control command to reduce the CD drive to a lower speed when a read-error occurs. In an alternate preferred embodiment, the read-error management program is provided to receive a user input for issuing the speed control command to reduce the CD drive to a lower speed when a read-error occurs.

9 Claims, 6 Drawing Sheets

READ-ERROR MANAGEMENT DURING RETRIEVING DATA STORAGE-MEDIUM EMPLOYING A DATA-RETRIEVING OPTICAL BEAM

BACKGROUND OF THE INVENTION

1. Field of the Invention

This invention relates generally to the system design and operation of a compact disk read-only-memory (CD ROM) drive. More particularly, this invention relates to a novel system design and operation function for a CD ROM drive to provide more convenient read-error correction and higher level of system fault-tolerance.

2. Description of the Prior Art

For modern computerized multi-media and telecommunication applications, a compact disk read-only-memory (CD-ROM) user is often required to deal with an annoying problem of read-errors in the process of reproducing or reading, e.g., 'down-loading', a large amount of data from a CD-ROM to another storage medium. The read-errors may be caused by surface defects of the CD-ROM or abnormal reflection of the laser beam in reading the data previously recorded in the CD-ROM caused by damages or contaminants on he CD-ROM surface. The read-errors may also be caused by surface distortions or other types of media abnormality or damages generated either initially in the production process or later in shipment, storage or operation. The data reading process is performed under the control of a program with well defined procedures. Specifically, in a personal computer operation environment, the reading process is controlled by a CD-ROM utility program under the control of an operating system (OS). Once a reading error occurs, the CD-ROM utility program issues a warning message to communicate to a personal computer user that an reading error has occurred. Several options are then provided, usually in the form of a manual, for the user to select whether a 'retry' attempt should be made to read the data again or to abort the execution of the CD-ROM reading program.

A retry will more likely be able to avoid a read-error when the read-error is caused by a temporary abnormal condition. For example, a retry may be able to overcome a previous read-error due to a data transmission error where the read-error is caused by a random noise on the line during transmission. However, it can be reasonably expected that a 'retry' generally would not provide a solution to resolve this read-error problem when the read-error is caused by a surface defect or contaminants on a CD-ROM. The same problem which presents itself on the CD-ROM when a retry is executed would generally cause the same error to occur again since all the circumstances are maintained the same and there is no particular reason to expect, by chance or good luck, that same error would not occur. A retry option as provided by a conventional CD-ROM drive now does not really enable a user to overcome a read-error when the surface of a CD-ROM is damaged or contaminated.

As of now, aided by the advances made in computerized multimedia and telecommunication applications, the use of CD-ROMs are gaining popularity. There are greater demands for improving the CD-ROM system to overcome these limitations and technical difficulties. Some prior art patents may be relevant as background information for one to more clearly understand the state of the art in CD-ROM system development.

A system for detecting defects on an optical surface is disclosed by Yoshikawa et al. in U.S. Pat. No. 4,505,585, entitled "System for Detecting Defects on an Optical Surface" (issued on Mar. 19, 1985), which employs a turntable to inspect the surface of an optical surface, e.g., a disk. An optical head is provided with an objective lens which has its focal point on the surface of the disk. A laser beam is projected through the object lens onto the surface of the disk and a reflective beam is processed by a defect signal generator which extracts only the defect signals from the reflected signals from the optical surface. The system for inspecting a defect on an optical surface is useful for a disk or semiconductor manufacturer to detect the defects on an optical surface before the disk is used for manufacture. Such a system would not be available nor useful for a CD-ROM user to correct data read errors at the time when errors have already occurred and the user is limited by the situation that duplication of data stored in that erroneous CD-ROM cannot be conveniently accomplished.

Satoh et al. disclose in U.S. Pat. No. 4,789,974, entitled "Optical Information Recording/reproducing Apparatus" (issued on Dec. 6, 1988), an optical information recording/reproducing system for recording/reproducing information on or from an optical disc with a laser beam to focus on the surface of a substrate of the optical disk so that the intensity or a frequency component of a reflected laser beam is used to detect a contaminants on the disk surface. The system also records a test signal containing a plurality of frequency components on a specific track on the optical disk which is reproduced and detected by the reflected laser beam to determine the difference between the amplitudes of the frequency components for detection of the contaminants on the optical disk surface. This technique is useful for detecting the contaminants on an optical surface. However, to a user, in reading data from a CD-ROM, the detection of the existence of contaminants is of little practical use. It does not provide to a user a simple and convenient method to solve the problem when data read-errors occur.

Nishida discloses in U.S. Pat. No. 5,063,545, entitled "Access Speed Detecting Means for Disk Player" (issued on Nov. 5, 1991), an apparatus for detecting the speed with which a light beam emitted by an optical head accesses a target record tack on an optical disc in which record track traverse data indicating track number are recorded previously. The traverse data is read and traverse data signals indicative of the scanning position of the light beam are produced. Deviations in traverse data signal obtained at predetermined time intervals are detected to form upper order data bits representing access speed. At the same time, tracking error data signals proportional to the deviation of the light beam from a record track on the disc are produced and a deviation in the tracking error data signals is detected to form the lower data bits of the access speed. By using the techniques disclosed in this patent, the optical head is controlled to a target track position to effect prompt and reliable data reading or writing on the target track. The apparatus disclosed in this patent also enables accurate detection of the access speed of a light beam. However, the techniques disclosed in this patent does not provide an apparatus or method to overcome the difficulties encountered by a CD-ROM user when read errors occur in reading data from an optical surface due to small surface defects or contaminants on a recording track.

Therefore, a need still exists for an improved CD-ROM drive system to overcome the aforementioned difficulties encountered in the prior art. Specifically, this CD-ROM drive system must provide to the user a practical and user-friendly method to solve a read-error problem. Furthermore, it would be desirable for such a system to provide several options that a user may make selections in choosing a method to solve this problem.

SUMMARY OF THE PRESENT INVENTION

Therefore, an object of the present invention is to provide a CD-ROM control system to overcome the aforementioned difficulties and limitations encountered in the prior art.

Specifically, it is an object of the present invention to provide a CD-ROM control system with speed reduction options when a read-error occurs in order to provide a practical technique to correct a read-error.

Another object of the present invention is to provide a CD-ROM control system with user selectable options to either adjust the reading speed manually or to automatically lower the reading speed when a read-error occurs.

Another object of the present invention is to provide a CD-ROM control system with a read-error correction program which is user-friendly such that a read-error can be practically and conveniently resolved.

Briefly, in a preferred embodiment, the present invention includes a compact disk read-only-memory (CD-ROM) drive system for reading data from a CD by employing a CD drive which is provided to operate at several reading speeds. The CD-ROM drive system includes a read-error management system for managing a read error. The read-error management system includes a speed control means allowing a user to reduce the CD drive to a lower speed whereby the user is provided to read the CD again at a lower speed wherein the read error is more likely to be prevented.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
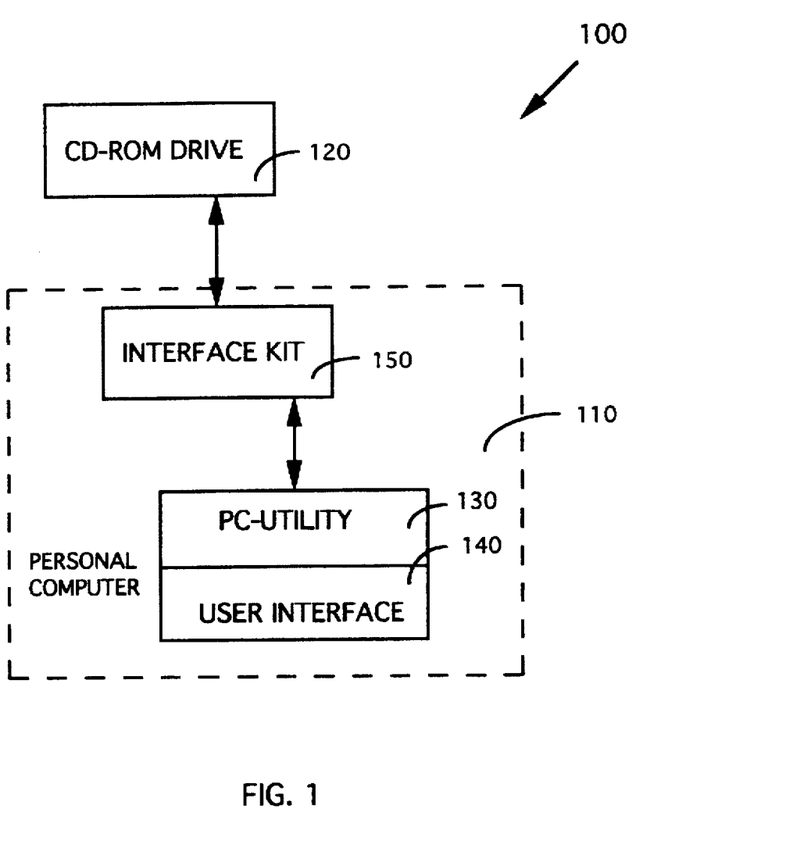
FIG. 1 is a functional block showing a CD-ROM control system where a speed reduction control for read-error correction technique is implemented in the personal computer (PC) utility program according to the present invention.

FIG. 1 is a system diagram of a CD-ROM control and interface system 100 of the present invention. The CD-ROM control and interface system 100 is incorporated with a personal computer 110 and connected to a CD-ROM drive, i.e., a CD-kit 120. The personal computer 110 includes a personal computer (PC) utility 130 which includes a user interface 140 to allow a user to input instructions. The user instructions provided through the user interface 140 to the PC utility 130 is first received by the CD-ROM control and interface system 100 to generate appropriate commands. The commands are transferred through an interface-kit 150 to control the CD-kit 120 according to the error correction techniques described below.

Figure 2A:
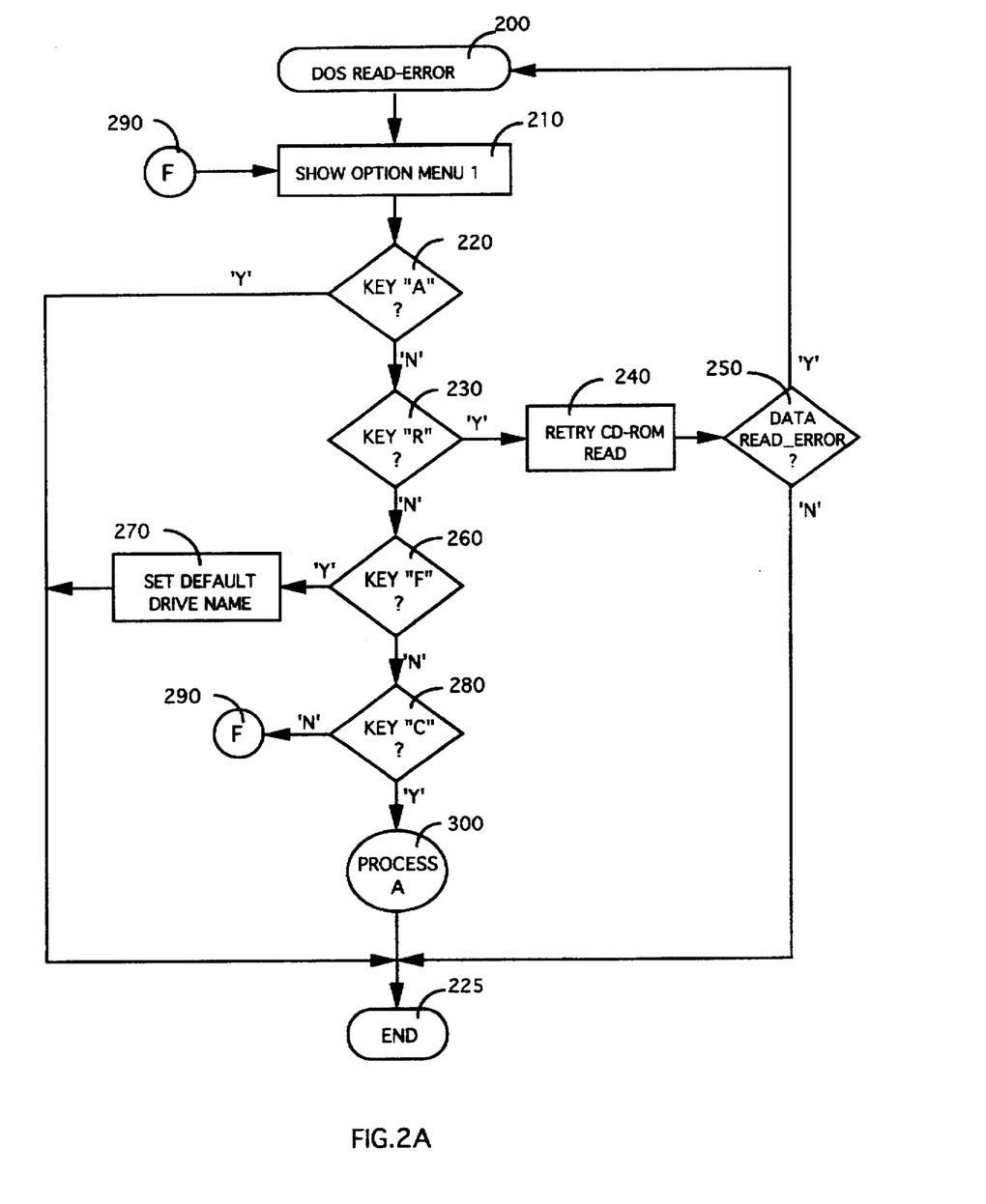
FIGS. 2A to 2E are flow charts showing the processing steps carried out by the read-error correction program of the present invention.
Figure 3:
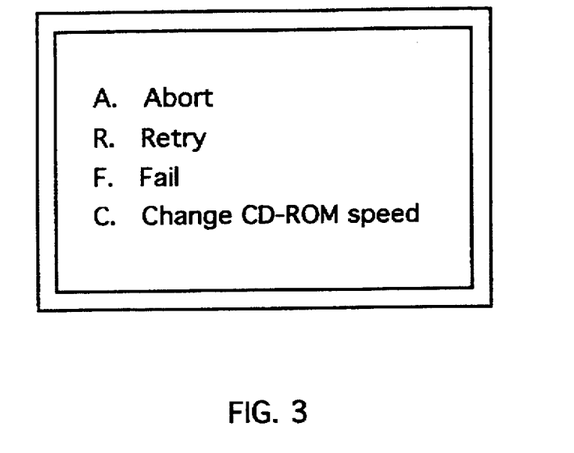
FIG. 3 is display manual for user to select different options when a read-error occurs.

The CD-ROM control and interface system 100 is actuated to perform an error-correction action when an read-error message is received (step 200). The read-error message is issued by an operating system (OS) such as a disk operating system (DOS). When a read error occurs, a first option manual as that shown in FIG. 3 is shown (step 210). In addition to the options for a user to select abort (A), retry (R), or fail (F), as that provided by a conventional error correction program, the error correction method of the present invention further provides an option to a user to change the CD-ROM speed (C). The capital letters, i.e., A, R, F, and C, represent a selection made by user with the user entering the capital letter through the user interface 140, e.g., a keyboard. Referring now to FIG. 2 when a user enters "A" (step 220) to abort, through the user interface 140, execution of the program for reading CD-ROM is ended (step 225). When the user enters "R" to retry (step 230), the reading program is executed again with the same default speed (step 240). A determination is made if an read-error occurs again (step 250), if no read-error is detected, execution of the program for reading the CD-ROM is ended (step 225). Otherwise, the read-error subroutine is called (step 200) and the above steps 200 to 250 are repeated. When the user enters "F" to recognize a read failure has occurred (step 260), a default drive name is set (step 270) and execution of the program for reading the CD-ROM is then ended (step 225). When the user enters "C" (step 280) to change the CD-ROM reading speed, then a process A is actuated (step 300). In the case that a user mistakenly enters a data item which is not included in the manual-1, a process F is started (step 290) which prompts the showing of the option manual-1 again to repeat the above steps.

Figure 2B:
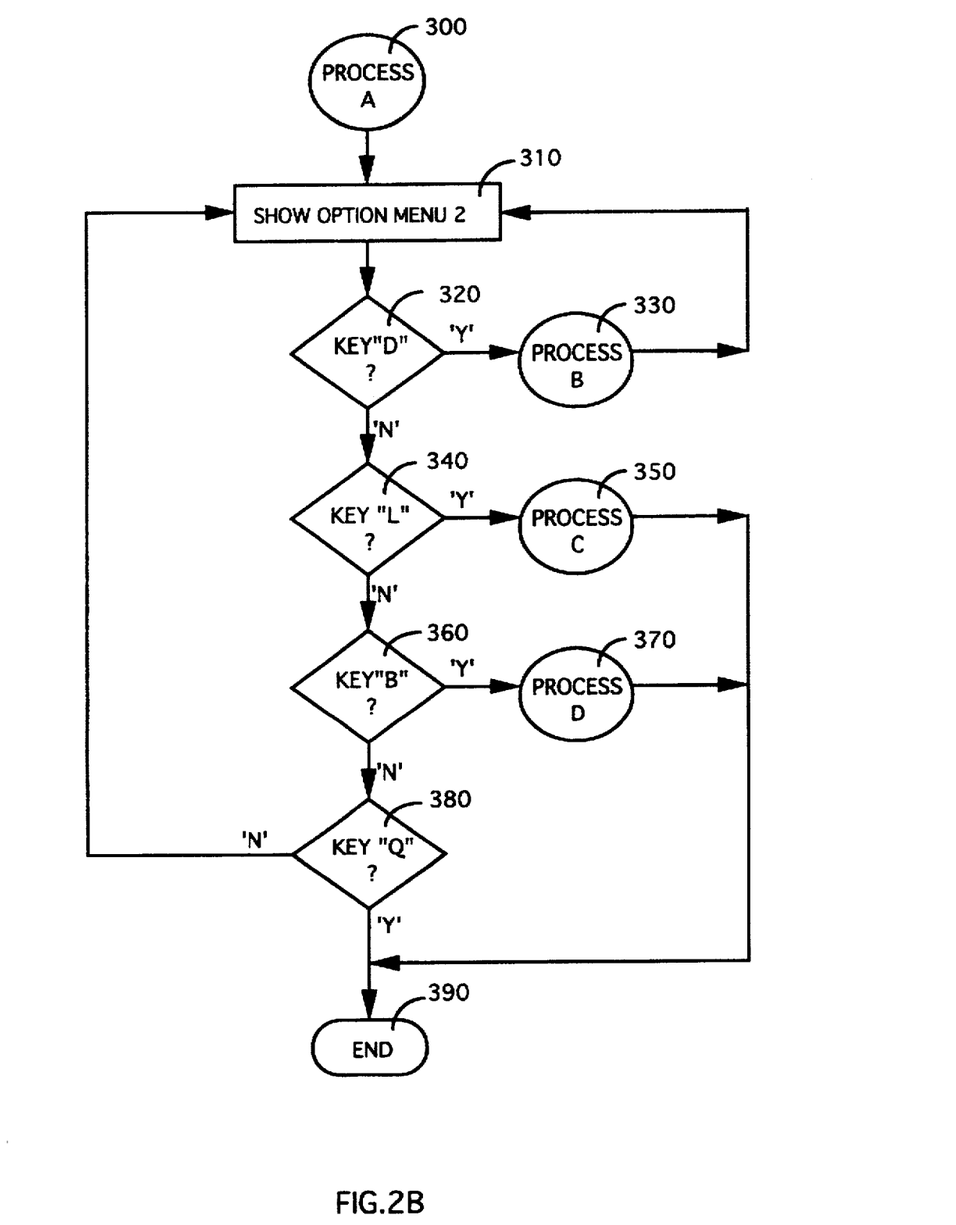
Figure 2C:
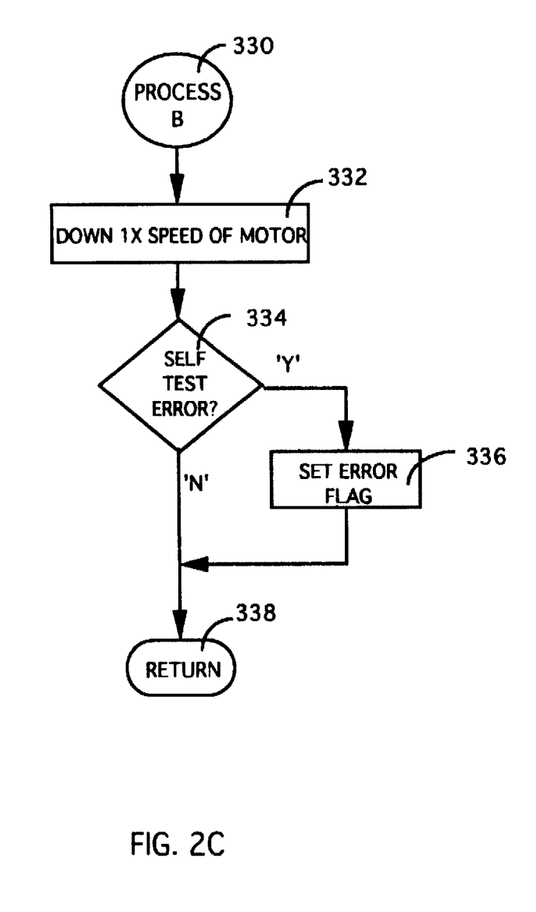
Figure 2D:
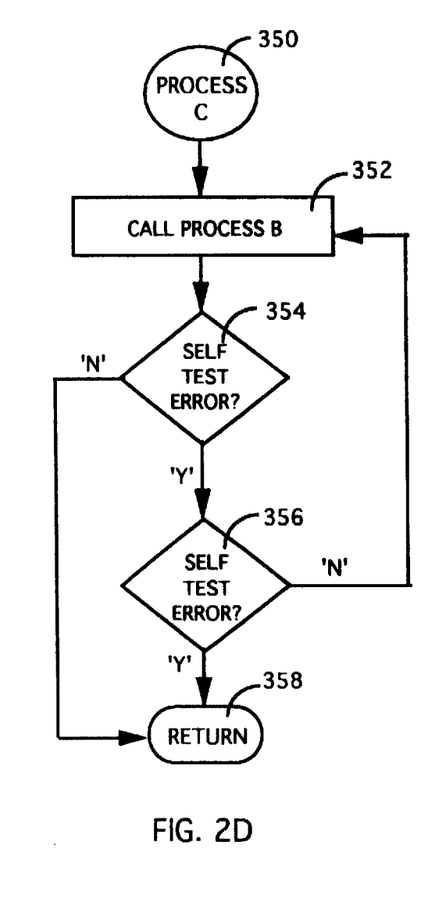
Figure 2E:
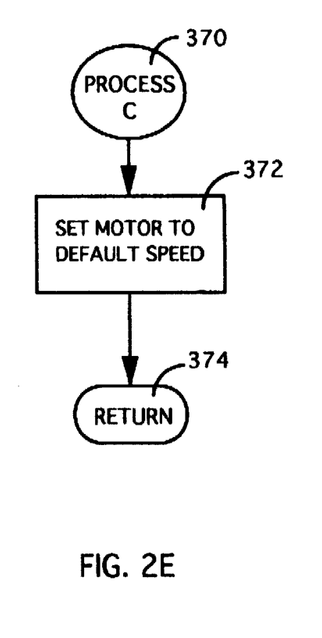
Figure 4:
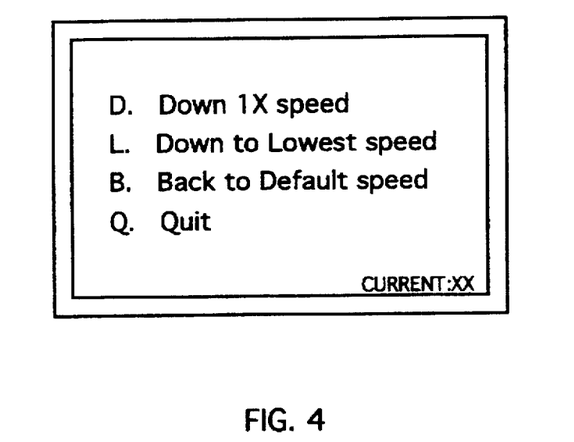
FIG. 4 is another display manual for a user to select speed reduction options to correct the read-error.

With the invocation of process A (step 300), referring to FIG. 2B now, an option manual-2 is shown (step 310). FIG. 4 shows the optional manual-2 where a user is presented with four options including (1) down 1X speed (D), (2) down to lowest speed (L), (3) back to default speed (B), and (4) quit (Q). When the user enters D (step 320) to lower the speed by one grade by entering "1X" a process B begins (step 330). In a CD-ROM convention, "X" represents a basic speed and a CD-ROM drive may be operated at a speed which is NX where N is an integer ranging typically from one to eight. The steps performed by the process B are shown in FIG. 2C. Similarly, when a user enters "L" (steps 340) to lower the reading speed to a lowest speed, a process C is invoked (step 350) and the steps performed in process C are shown in FIG. 2D. Finally, when a user enters "B" (steps 360) to set the motor speed to a default speed, a process D is invoked (step 370) and the steps performed in process D are shown in FIG. 2E. Instead of the above selections, if a user enters "Q" (step 380) to quit from this program of process A, execution of the process A program is ended (step 390) and execution of the program is returned to step 225 of the read-error management program to end the read-error management processes. In a same manner, after the execution of processes B, C, and D as will be explained below in FIGS. 2C, 2D, and 2E respectively, the process A is ended (step 390) and a return is made to the read-error management program to terminate that process (step 225).

FIG. 2C shows the steps performed by the read-error management program when a user selects to reduce the reading speed by 1X. A command is issued to lower the reading speed by 1X (step 332), in reading the CD-ROM data at a speed lowered by 1X, a self test is made to determine if a read-error has occurred (step 334) and an error flag is set when a read error occurs (step 336). The execution of the process B is then completed and return to process A (step 338). FIG. 2D shows the steps performed by the read-error management program when a user selects to reduce the reading speed to a lowest reading speed. The process B is invoked to lower the reading speed by 1X (step 352), in reading the CD-ROM data at a speed lowered by 1X, a self test is made to determine if a read-error has occurred (step 354) and a check is made to determine if the lowest reading speed is reached when a read error occurs (step 356) and return to step 352 (call process B) to again lower the reading speed by 1X if the lowest speed is not yet reached. The execution of the process C is then completed and return to process A (step 358) when no reading error occurs or when the lowest reading speed is reached. FIG. 2E shows the steps performed by the read-error management program when a user selects to set the reading speed to a default reading speed in process D (step 370). A command is issued to set the CD-ROM drive motor to a default speed (step 372) and then return to process A (step 374). Appendix A which is attached at the end of the specification is a list of high level language program code showing the sequence of execution of the read-error management system described above.

Figure 5:
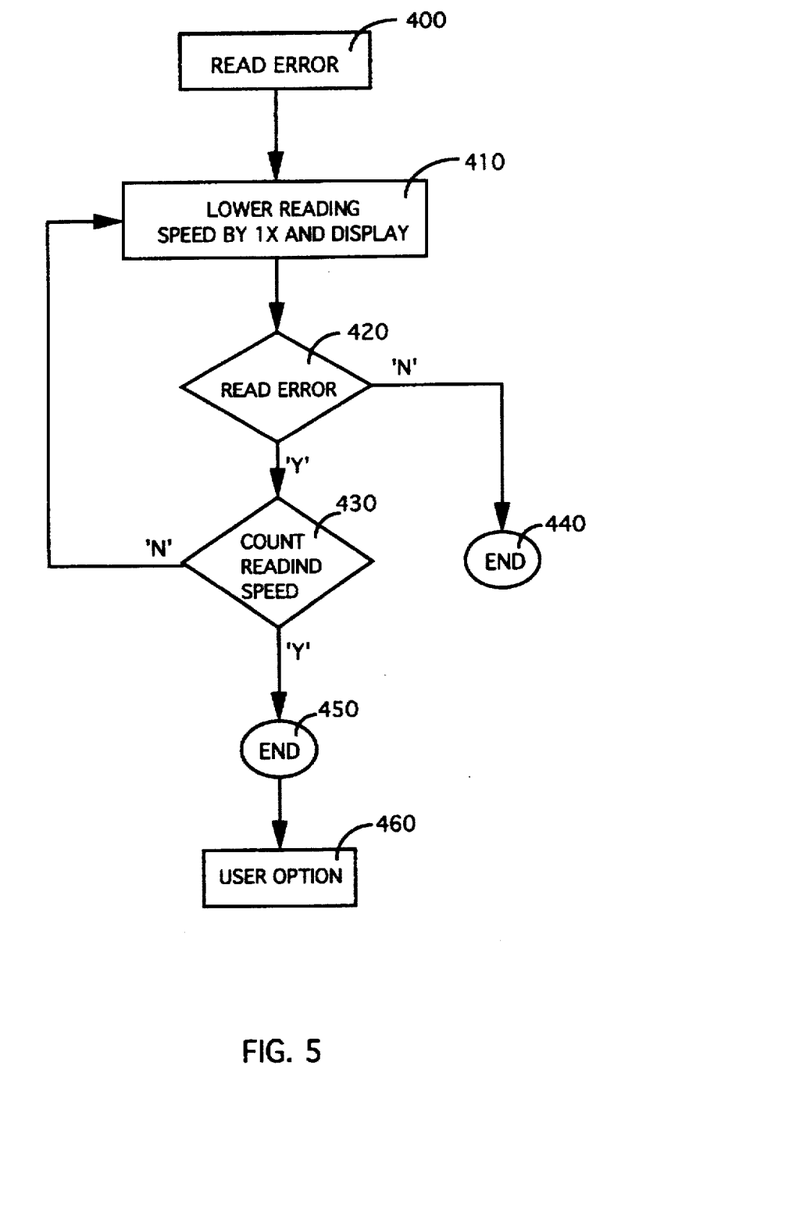
FIG. 5 is a flow chart of another preferred embodiment of the present invention where the error-correction program automatically manage a speed reduction to correct the read-errors.

FIG. 5 shows the steps carried by another preferred embodiment of the present invention. The CD-ROM control and interface system 100 is actuated to perform an error-correction action when an read-error message is received (step 400). The read-error message is issued by an operating system (OS) such as a disk operating system (DOS). When a read error occurs, a first action is taken to automatically lower the reading speed by 1X, and also a display message is shown to inform the user that an read-error has occurred and the system has executed an error correction program to automatically lower the reading speed by 1X (step 410). As the PC utility 130 issue a lower speed command to the interface kit 150 which in turn control the CD-drive kit 120 to read the CD-ROM at a lower speed, the error correction program in the PC-utility 130 is waiting for a read error message (step 420). If a read-error occurs again, a check is made to determine is the speed current applied to read the CD-ROM the lowest speed (step 430), if it is not, then the program returns to step 410 to lower the reading speed by another 1X and issuing another display message to inform the user that an read-error has occurred again and the reading speed is reduced by another 1X. On the other hand, if no read-error occurs, then the read-error correction program ends (step 440) and a display message is shown to inform the user that the read-error has been corrected. If a lowest reading speed is already being applied and a read error still occurs, then the error correction program also ends and a display message is shown to inform the user that a lowest reading speed is employed to read the CD-ROM but a read-error still occurs (step 450). A user is then provided with options to read the CD-ROM again or to abort the reading process (step 460).

Therefore, the present invention discloses a compact disk read-only-memory (CD-ROM) drive system 100 for reading data from a CD by employing a CD drive 120 which is provided to operate at several reading speeds. The CD-ROM drive system 100 includes a read-error management system, i.e., an error correction program residing in the PC-utility 130, for managing a read error. The read-error management system includes a speed control means allowing a user, through a selection entered from the option manuals shown in FIGS. 3 and 4, to reduce the CD drive to a lower speed whereby the user is provided to read the CD again at a lower speed wherein the read error is more likely to be prevented.

The present invention also discloses a compact disk read-only-memory (CD-ROM) data handling system 100 for reading data from a CD by employing a CD drive 120 which is controlled by a computer 110 through an CD-interface 150 to operate at several reading speeds. The CD-ROM data handling system 100 includes a read-error management program executed by the computer 110 for managing a read error. The read-error management program issuing a speed control command through the CD-interface 150 for reducing the CD drive 120 to a lower speed for reading the CD-ROM again at a lower speed whereby the read error is more likely to be prevented. In a preferred embodiment, the read-error management program is provided to automatically issue the speed control command to reduce the CD drive 120 to a lower speed when a read-error occurs. In an alternate preferred embodiment, the read-error management program is provided to receive a user input for issuing the speed control command to reduce the CD drive 120 to a lower speed when a read-error occurs.

The present invention also discloses a method for managing a read-error for a compact disk read-only-memory (CD-ROM) data handling system in reading data from a CD by employing a CD drive controlled by a computer through an CD-interface to operate at several reading speeds. The read-error management method including the steps of: (a) executing a read-error management program in the computer for issuing a speed control command through the CD-interface for reducing the CD-drive to a lower speed; and (b) reading the CD-ROM again at a lower speed whereby the read error is more likely to be prevented. In a preferred embodiment, the step (a) of executing a read-error management program in the computer for issuing a speed control command is a step of executing the read-error management program and issuing the speed control command automatically when the read-error occurs. In an alternate preferred embodiment, the step (a) of executing a read-error management program in the computer for issuing a speed control command is a step of providing an option for a user to enter a speed control input for issuing the speed control command according to the speed control input when the read-error occurs.

Therefore, the present invention has the advantage that it provides a CD-ROM data handling system to overcome the difficulties and limitations encountered in the prior art. Specifically, the present invention provides a CD-ROM data handling system with speed reduction options when a read-error occurs in order to provide a practical technique to correct a read-error. A user is provided with selectable options to either adjust the reading speed manually or to automatically lower the reading speed when a read-error occurs. The read-error correction program provided in this invention is user-friendly such that a read-error can be practically and conveniently resolved.

The CD-ROM data handling system discussed above is only one specific example among many data retrieval systems in reading data from a storage medium by the use of a data retrieving optical beam, e.g., a laser beam. Such data retrieval system generally includes a optical system to carry out the functions of beam processing, pointing, tracking and focusing, and optical signal processing. The data retrieval system also includes a servo mechanism with motor and coils to move a pickup head which is used to contain and protect the optical system. The data to be retrieved from the storage medium may include audio, video, text, e.g., binary data in ASCII format, or other types of data stored in medium to be retrieved and further processed. The data retrieval operations therefore can involve broad spectrum of systems employing optical beams of different wavelengths for retrieving different data in various formats to be processed by varieties of signal process algorithms. However, with these broad spectrum of data retrieval systems applying optical beams, a common characteristic in data-retrieval errors is their relationship with the reading speed. Most likely than not, higher reading speed may lead to more read-errors while the same data reading error may not occur when a lower speed is employed. For that reason, the basic principle according to the present invention to apply a slower speed for read-error correction, is applicable for almost all types of data retrieval systems which employ an optical beam onto a data storage medium for data retrieval operation. The specific example of a CD-ROM system as disclosed in the present invention provides an excellent illustration to demonstrate how a read-error can be effectively corrected by reducing the reading speed.

In another preferred embodiment, a data handling system implements a method for managing a read-error in reading data from a data storage medium by employing a data retrieval optical beam to retrieve the data at several reading speeds. Under certain read-error conditions, the system may be turned off. The data handling system includes a read-error shut-off detecting means to detect that a shut-off command is issued due to certain read errors. Upon detecting a read-error shut-off signal the operating system of the data handling system automatically issues a re-start command to reboot the system without user interference. Upon the data handling system is rebooted, an error message is also displayed to inform the user what type of read-error has occurred.

Therefore, the present invention also discloses a method for managing a read-error for a data retrieval system in reading data from a data storage medium by employing a data retrieval optical beam for retrieving the data at several reading speeds. The method includes the steps of: (a) detecting a read error when the read error occurs; and (b) controlling the data retrieval system for retrieving the data from the storage medium at a lower speed for reducing a probability of occurrence of the read error.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

---

APPENDIX A
Improved Read-Error Management During Retrieving Data From Storage-Medium Employing A Data-Retrieving Optical Beam Program Flowchart

```
*Main()
{
    if( Read_error )
    {
        Get_key=Show_option_menu_1();
        Switch ( Get_key ):
            Key_A:
                        Abort_from_read();
            Key_R:
```

---

-continued

APPENDIX A
Improved Read-Error Management During Retrieving Data From Storage-Medium Employing A Data-Retrieving Optical Beam Program Flowchart

```
            Key_F:
                        Retry-read();
            Key_C:
                        Fail_to_read();
            Default:
                        Change_speed();
                        Null_return();
    }
}
*Abort_from_read()
{
    Show_error_message(Abort);
    Exit to DOS.
}
*Retry_read()
{
    Show_error_message(Retry);
    Read again
}
*Fail_to_read()
{
    Show_error_message(Fail);
    Exit to DOS.
}
*Change_speed()
{
    Get_key=Show_option menu_2();
    Swtich ( Get_key ):
            Key_D:
                        Down_one_speed_level();
            Key_L:
                        Down_to_lowest_speed();
            Key_B:
                        Back_to_default_speed();
            Key_Q:
                        Quit_from_menu();
            Default:
                        Null_return();
}
*Down_one_speed_level()
{
    Send commend (down one speed level) to drive.
}
*Down_to_lowest_speed()
{
    Send command (down to lowest speed) to drive.
}
*Back_to_default_speed()
{
    Send commend _back to default speed) to drive.
}
*Quit_from_menu()
{
    Return();
}
*Null_return()
{
    Return();
}
```

We claim:

1. A method for resolving a detected read-error for a compact disk read-only-memory (CD-ROM) data handling system in reading data from a CD by employing a CD drive controlled by a computer through an CD-interface to operate at several reading speeds, said method comprising the steps of:

(a) detecting a read error in reading data from said CD and executing a read-error resolving program to stop reading data from said CD;

(b) providing a user interface message for a user to make one selection among a plurality of options including aborting, retrying, or changing speed in reading data from said CD;

(c) receiving a user input providing said one selection among said plurality of options;

(d) responding to a user input of changing speed by displaying a second user interface message providing a plurality of user options including selection of reading data from said CD with a user designated slower reading speed;

(e) receiving said user designated slower reading speed and issuing a reading speed command corresponding to said user designated slower reading speed; and (f) reading data from said CD again at a user designated slower reading speed for a whereby said read-error may be resolved.

2. The method for resolving said incurred read-error of claim 1 further comprising a step of:

(g) determining if said error is resolved and repeating said steps (a) to (f) again if said read error still occurs thus allowing said user to sequentially select a lower reading speed whereby said read error may be resolved by iteratively applying the method of resolving said incurred read error.

3. The method for resolving said incurred read-error of claim 1 further comprising a step of:

(h) determining if said error is resolved when a lowest reading speed is selected by said user; and (i) if said read error still occurs, displaying a user interface message for indicating a failure in resolving said read error and providing further user choices for selecting options relating to reading data from said CD including stop reading data from said CD.

4. The method for resolving said incurred read-error of claim 1 wherein:

said step (d) of responding to a user input of changing speed by displaying a second user interface message providing a plurality of user options including selection of reading data from said CD with a user designated slower reading speed including a step of allowing a user to select a lowest reading speed; and said step (f) of reading data from said CD again at a user designated slower reading speed is a step of read data from said CD at said lowest reading speed whereby said read-error may be resolved.

5. The method for resolving said incurred read-error of claim 4 further comprising a step of:

(h) determining if said error is resolved applying said lowest reading speed as designated by said user; and (i) if said read error still occurs, displaying a user interface message for indicating a failure in resolving said read error and providing further user choices for selecting options relating to reading data from said CD including stop reading data from said CD.

6. A compact disk read-only-memory (CD-ROM) data handling system for reading data from a CD by employing a CD drive which is provided to operate at several reading speeds, said CD-ROM data handling system comprising:

a read error detecting means for detecting a read error in reading data from said CD and issuing a read error detected signal;

a read-error resolving means for receiving said read error detected signal to stop reading data from said CD and for issuing user interface messages for resolving said read error;

a user interface system for receiving and displaying said user interface messages and for receiving a user input in selecting among a plurality of options, including slowing down a reading speed at a plurality of lower speed-levels, for directing said read error resolving means in resolving said read error in reading data from said CD;

said read-error resolving means further includes a speed control means provided for receiving said user input for reducing said CD drive to one of said plurality of lower speed-levels;

said read error resolving means further includes a read-again command issuing means for issuing a read again command including said user input of lower speed to control said CD drive for reading data from said CD again at said lower speed level whereby said read-error may be resolved.

7. The CD-ROM data handling system of claim 6 wherein:

said read error resolving means further includes a lower speed sequencing means provided for receiving said user input of a selection for slowing down said reading speed at a sequence of lower speed levels for directing said CD drive to read data from said CD at each of said sequence of lower speed levels until said read error is resolved.

8. The CD-ROM data handling system of claim 6 wherein:

said read error resolving means further includes a read failure management means for determining if said read error is resolved when a lowest reading speed is employed in reading data from said CD and for directing said user interface system for displaying a user interface message for indicating a failure in resolving said read error if said read error still occurs and for providing further user choices for selecting options relating to reading data from said CD including stop reading data from said CD.

9. The CD-ROM data handling system of claim 6 wherein:

said user interface system further includes a lowest speed selection means for receiving a user input in selecting a lowest reading speed among said plurality of user options for reading data from said CD at said lowest reading speed whereby said read-error may be resolved.

* * * * *